United States Patent
Oh (10) Patent No.: US 11,318,937 B2
(45) Date of Patent: May 3, 2022

(54) DRIVER ASSISTANCE APPARATUS AND METHOD THEREOF

(71) Applicant: MANDO CORPORATION, Pyeongtaek-si (KR)

(72) Inventor: Kwang Hwan Oh, Suwon-si (KR)

(73) Assignee: Mando Mobility Solutions Corporation, Pyeongtaek-si (KR)

( * ) Notice: Subject to any disclaimer, the term of this patent is extended or adjusted under 35 U.S.C. 154(b) by 232 days.

(21) Appl. No.: 16/709,014

(22) Filed: Dec. 10, 2019

(65) Prior Publication Data

US 2020/0238986 A1 Jul. 30, 2020

(30) Foreign Application Priority Data

Jan. 24, 2019 (KR) .................. 10-2019-0009067

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/18* (2013.01); *B60W 10/20* (2013.01); *B60W 50/14* (2013.01);
(Continued)

(58) Field of Classification Search
CPC .................. B60W 10/18; B60W 10/20; B60W 2050/143; B60W 2050/146; B60W 2420/42; B60W 2420/52; B60W 2520/10; B60W 2552/53; B60W 2554/4041; B60W 2710/18; B60W 2710/20; B60W 30/12; B60W 50/14; G01S 13/867; G01S 13/87; G01S 13/931; G01S 2013/9318; G01S 2013/93185; G01S 2013/93271; G01S 2013/93272; G01S 2013/93274; G01S 2013/9329; G01S 7/411; B62D 15/025; B62D 15/029; G06K 9/00798
See application file for complete search history.

(56) References Cited

U.S. PATENT DOCUMENTS

| 8,676,443 B2 * | 3/2014 | Han | B60W 30/09 |
| | | | 701/42 |
| 9,308,914 B1 * | 4/2016 | Sun | B60K 28/06 |

(Continued)

FOREIGN PATENT DOCUMENTS

| KR | 10-178996 B1 | 10/2017 |
| KR | 10-2018-0065730 A | 6/2018 |

*Primary Examiner* — Babar Sarwar
(74) *Attorney, Agent, or Firm* — Morgan, Lewis & Bockius LLP (57) ABSTRACT

A driver assistance system (DAS) configured to determine a lane provided with a radar reflector includes a radar configured to emit radio wave in front of the vehicle and obtain radar data by receiving reflected wave reflected from an object in front of the vehicle; a controller configured to determine whether the object is the radar reflector based on the magnitude of energy of the reflected wave included in the obtained radar data, and to determine a line connecting the determined radar reflector as a lane. It is an object of the present invention to provide a driver assistance system and a driver assistance method capable of obtaining lane information based on a radar track.

20 Claims, 8 Drawing Sheets

(51) Int. Cl.
 *B60W 50/14* (2020.01)
 *G01S 13/931* (2020.01)
 *G01S 13/86* (2006.01)
 *B60W 10/18* (2012.01)
(52) U.S. Cl.
 CPC .......... *G01S 13/867* (2013.01); *G01S 13/931* (2013.01); *B60W 2050/143* (2013.01); *B60W 2050/146* (2013.01); *B60W 2420/42* (2013.01); *B60W 2420/52* (2013.01); *B60W 2554/4041* (2020.02); *B60W 2710/18* (2013.01); *B60W 2710/20* (2013.01); *G01S 2013/9318* (2020.01); *G01S 2013/9329* (2020.01); *G01S 2013/93185* (2020.01)

(56) References Cited

U.S. PATENT DOCUMENTS

| | | | | |
|---|---|---|---|---|
| 9,478,137 | B1* | 10/2016 | Nelson | G01S 17/88 |
| 10,996,672 | B2* | 5/2021 | Sato | B60W 30/18163 |
| 11,021,060 | B2* | 6/2021 | Cieler | B60K 37/06 |
| 11,097,730 | B2* | 8/2021 | Bohrer | B60W 30/162 |
| 2004/0117090 | A1* | 6/2004 | Samukawa | G01S 17/42 |
| | | | | 701/45 |
| 2005/0278098 | A1* | 12/2005 | Breed | G01S 7/0235 |
| | | | | 701/45 |
| 2011/0313259 | A1* | 12/2011 | Hatakeyama | B60K 28/06 |
| | | | | 600/300 |
| 2012/0123659 | A1* | 5/2012 | Sato | B60W 30/16 |
| | | | | 701/96 |
| 2013/0002470 | A1* | 1/2013 | Kambe | G01S 13/867 |
| | | | | 342/55 |
| 2014/0236482 | A1* | 8/2014 | Dorum | G01C 21/34 |
| | | | | 701/533 |
| 2015/0344027 | A1* | 12/2015 | Oooka | G01C 21/26 |
| | | | | 701/408 |
| 2016/0193971 | A1* | 7/2016 | Yellambalase | B60R 11/04 |
| | | | | 348/148 |
| 2016/0193997 | A1* | 7/2016 | Yellambalase | B60W 30/08 |
| | | | | 701/36 |
| 2016/0196748 | A1* | 7/2016 | Yellambalase | G06K 9/00798 |
| | | | | 340/435 |
| 2016/0339959 | A1* | 11/2016 | Lee | G06K 9/00798 |
| 2017/0210383 | A1* | 7/2017 | Nishimura | B60W 30/0956 |
| 2018/0178802 | A1* | 6/2018 | Miyata | B60W 10/06 |
| 2018/0346026 | A1* | 12/2018 | Fujii | B60W 30/09 |
| 2018/0370527 | A1* | 12/2018 | Rachor | B60W 50/14 |
| 2019/0072970 | A1* | 3/2019 | Izumori | G05D 1/0257 |
| 2019/0106108 | A1* | 4/2019 | Wienecke | B60R 11/04 |
| 2019/0154842 | A1* | 5/2019 | Adachi | G01S 19/41 |
| 2019/0227546 | A1* | 7/2019 | Sato | G05D 1/0061 |
| 2019/0250269 | A1* | 8/2019 | Miu | B60W 30/12 |

* cited by examiner

DRIVER ASSISTANCE APPARATUS AND METHOD THEREOF

CROSS-REFERENCE TO RELATED APPLICATION(S)

This application is based on and claims priority under 35 U.S.C. § 119 to Korean Patent Application No. 10-2019-0009067, filed on Jan. 24, 2019 in the Korean Intellectual Property Office, the disclosure of which is incorporated by reference in its entirety.

BACKGROUND

1. Technical Field

Embodiments of the present disclosure relate to a driver assistance apparatus, and more particularly, a driver assistance apparatus configured to perform forward collision avoidance.

2. Description of the Related Art

In general, a vehicle is a machine which travels on roads or tracks using fossil fuels, electricity, etc. Vehicles may move in various directions according to rotation of at least one wheel mounted to a vehicle body. Such vehicles may include, for example, a three-wheeled or four-wheeled vehicle, a two-wheeled vehicle such as a motorcycle, a motorized bicycle, construction equipment, a bicycle, a train traveling on rails, and the like.

The number of users who use vehicles as simple transportation means in modern society is rapidly increasing. With rapid development of vehicle technology, users or people who use vehicles can easily enjoy long distance travel, resulting in a high standard of living in daily life. However, within areas with high population density, such as Korea, road traffic situations may be seriously deteriorated such that traffic congestion becomes more serious day by day.

In recent times, in order to mitigate driver difficulty as well as to increase driver's convenience during vehicle driving, many developers and companies are conducting intensive research into a vehicle provided with an advanced driver assistance system (ADAS), such that the ADAS-embedded vehicle can actively provide the driver with various kinds of information, for example, vehicle states, driver's states, peripheral environment information, etc.

A representative example of the ADAS embedded in the vehicle may include a Forward Collision Avoidance (FCA) system, an Autonomous Emergency Brake (AEB) system, a Driver Attention Warning (DAW) system, etc. The ADAS may determine the degree of possibility of collision between a host vehicle provided with the ADAS and another object (or a peripheral vehicle) during driving of the host vehicle. If there is a high possibility of collision between the host vehicle and other vehicles, the ADAS may allow the host vehicle to perform emergency braking, such that the host vehicle can avoid collision between the host vehicle and another vehicle, and can also provide a warning message to a driver of the host vehicle.

In general, a lane keeping assistance system (LKAS) is a system that assists in driving convenience by generating auxiliary steering force when a vehicle leaves a lane while driving by using lane information obtained from a camera.

However, the camera may cause lane misunderstanding or misunderstanding due to direct sunlight, dust on the road, or the like, and may cause limitations in the lane keeping assist function due to visual delays until recognition. In addition, LKAS is sensitive to changes in lanes in the near and far areas. However, lanes take longer to recognize, resulting in performance limitations.

SUMMARY

In view of the above, it is an aspect of the present disclosure to provide a driver assistance system and a driver assistance method for recognizing lanes based on radar tracks and obtaining lane information.

In accordance with an aspect of the present disclosure, a driver assistance system (DAS) configured to determine a lane provided with a radar reflector includes a radar configured to emit radio wave in front of the vehicle and obtain radar data by receiving reflected wave reflected from an object in front of the vehicle; and a controller configured to determine whether the object is the radar reflector based on the magnitude of energy of the reflected wave included in the obtained radar data, and to determine a line connecting the determined radar reflector as a lane.

The controller may determine the object as the radar reflector when the magnitude of energy of the reflected object is greater than or equal to a predetermined magnitude.

The driver assistance system further includes a camera configured to obtain forward-view image data of the vehicle; and the controller may determine the lane based on the image data and the radar data.

The controller may determine the lane using the radar data when determining a lane located farther than a predetermined distance with respect to the vehicle.

The controller may determine the lane using the image data when determining a lane located closer than a predetermined distance with respect to the vehicle.

In accordance with another aspect of present disclosure, a driver assistance method configured to determine a lane provided with a radar reflector, the method includes emitting radio wave in front of the vehicle and obtaining radar data by receiving reflected wave reflected from an object in front of the vehicle; determining whether the object is the radar reflector based on the magnitude of energy of the reflected wave included in the obtained radar data, and determining a line connecting the determined radar reflector as a lane.

Determining whether the object is the radar reflector based on the magnitude of energy of the reflected wave included in the obtained radar data may include determining the object as the radar reflector when the magnitude of energy of the reflected object is greater than or equal to a predetermined magnitude.

The method may further includes obtaining forward-view image data of the vehicle; and the method may include determining the lane based on the image data and the radar data.

Determining the lane based on the image data and the radar data may include determining the lane using the radar data when determining a lane located farther than a predetermined distance with respect to the vehicle.

Determining the lane based on the image data and the radar data may include determining the lane using the image data when determining a lane located closer than a predetermined distance with respect to the vehicle.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout. This specification does not describe all elements of the embodiments of the present disclosure and detailed descriptions on what are well known in the art or redundant descriptions on substantially the same configurations may be omitted.

The terms 'unit, module, member, and block' used herein may be implemented using a software or hardware component. According to an embodiment, a plurality of 'units, modules, members, or blocks' may also be implemented using an element and one 'unit, module, member, or block' may include a plurality of elements.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members. The terms first, second, etc. are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

Figure 1:
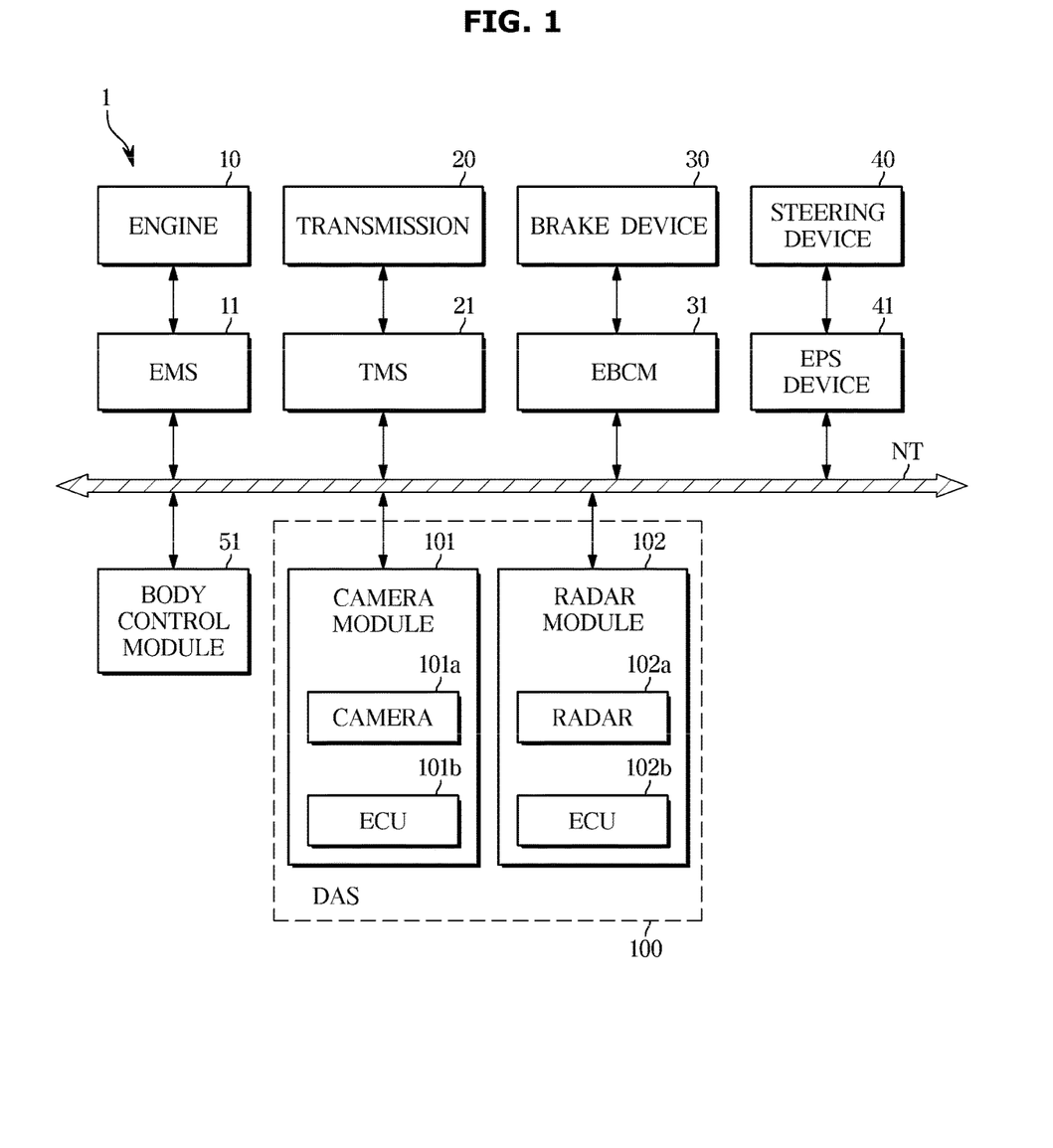
FIG. 1 illustrates a configuration of a vehicle according to an embodiment.

FIG. 1 illustrates a configuration of a vehicle according to an embodiment.

Referring to FIG. 1, the vehicle 1 may include an engine 10, a transmission 20, a brake device 30, and a steering device 40. The engine 10 may include at least one cylinder and at least one piston, and may generate power needed to drive the vehicle 1. Alternatively or additionally, the engine 10 may include an electric or other motor, such as an electric motor including a rotor and a stator, configured to generate power to move the vehicle 1. The transmission 20 may include a plurality of gears, and may transmit power generated by the engine 10 to wheels of the vehicle 1. The brake device 30 may decelerate or stop the vehicle 1 through frictional force on wheels. The brake device 30 may include one or more brake pads and brake shoes operative to decelerate or stop the vehicle. The steering device 40 may change the traveling direction of the vehicle 1. The steering device 40 may include a linkage operative to change a direction or orientation of wheel(s) of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a Driver Assistance System (DAS) 100.

The EMS 11 may control the engine 10 in response to either the driver's acceleration intention from the acceleration pedal or a request signal from the driver assistance system (DAS) 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The electronic brake control module (EBCM) 31 may control a brake device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implantation of Electronic Stability Control (ESC). In addition, the EBCM 31 may temporarily brake wheels in response to wheel slippage detected by vehicle driving, resulting in implementation of a Traction Control System (TCS).

The electronic power steering (EPS) device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The driver assistance system (DAS) 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., host vehicle), and may perform driving, braking, and/or steering of the vehicle 1 in response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The DAS 100 may include a camera module 101 operative to acquire image data of a peripheral region of the vehicle 1 (e.g., a region outside of and surrounding the vehicle 1), and a radar module 102 operative to acquire data about a peripheral object present in the peripheral region of the vehicle 1. The camera module 101 may include a camera 101a or multiple cameras and an Electronic Control Unit (ECU) controller 101b. The camera 101a may capture an image including a forward region of the vehicle 1 (e.g., a region in front of the vehicle 1), and may include an image processor operative to process the captured image to recognize peripheral vehicles, pedestrians, cyclists, lanes, traffic signs, or the like in the captured image. The radar module 102 may include a radar 102a or multiple radars and an Electronic Control Unit (ECU) controller 102b, and may acquire or determine a relative position, a relative speed, or the like of the peripheral object (e.g., a peripheral vehicle, a pedestrian, or a cyclist) of the vehicle 1 based on sensed radar data.

The scope or spirit of the DAS 100 according to the present disclosure is not limited thereto, and the DAS 100 may further include a Light Detection And Ranging (LiDAR) sensor to detect the presence or absence of a peripheral object by monitoring (or scanning) the peripheral region of the vehicle 1.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

Figure 2:
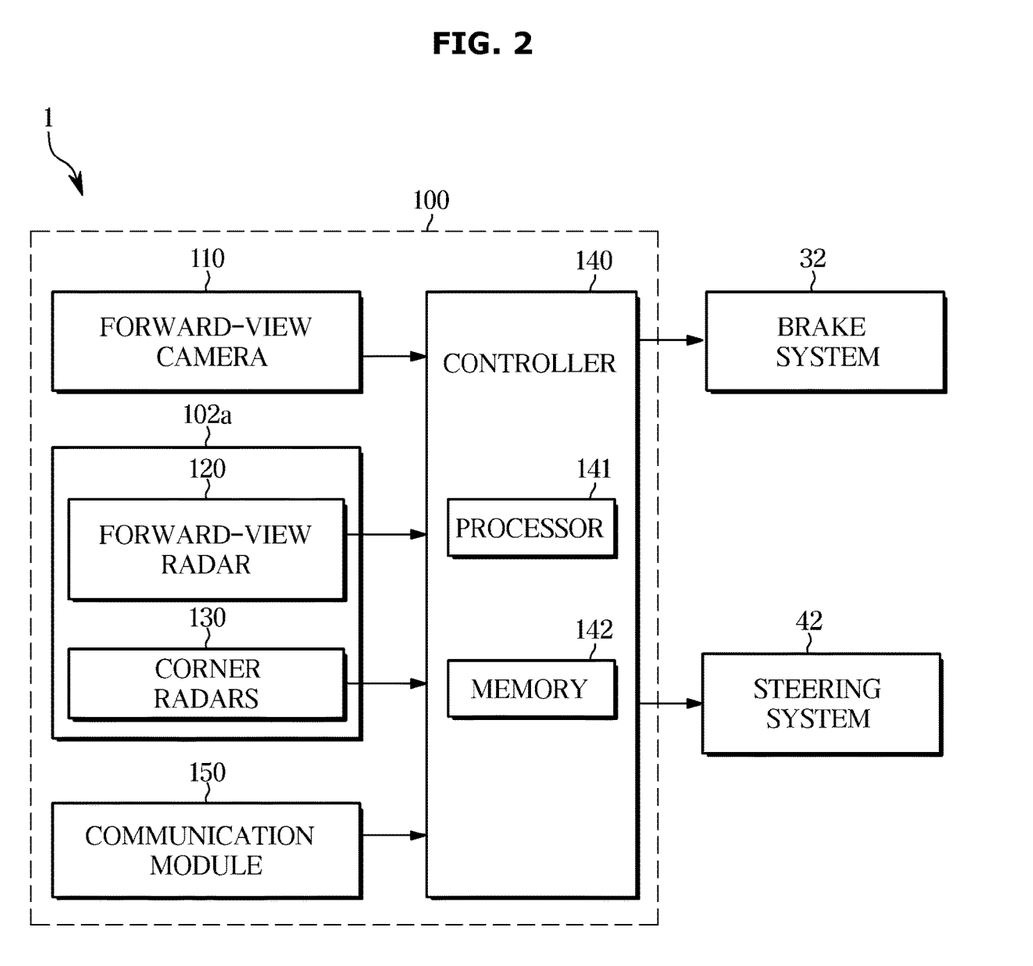
FIG. 2 illustrates a configuration of a driver assistance system according to an embodiment.
Figure 3:
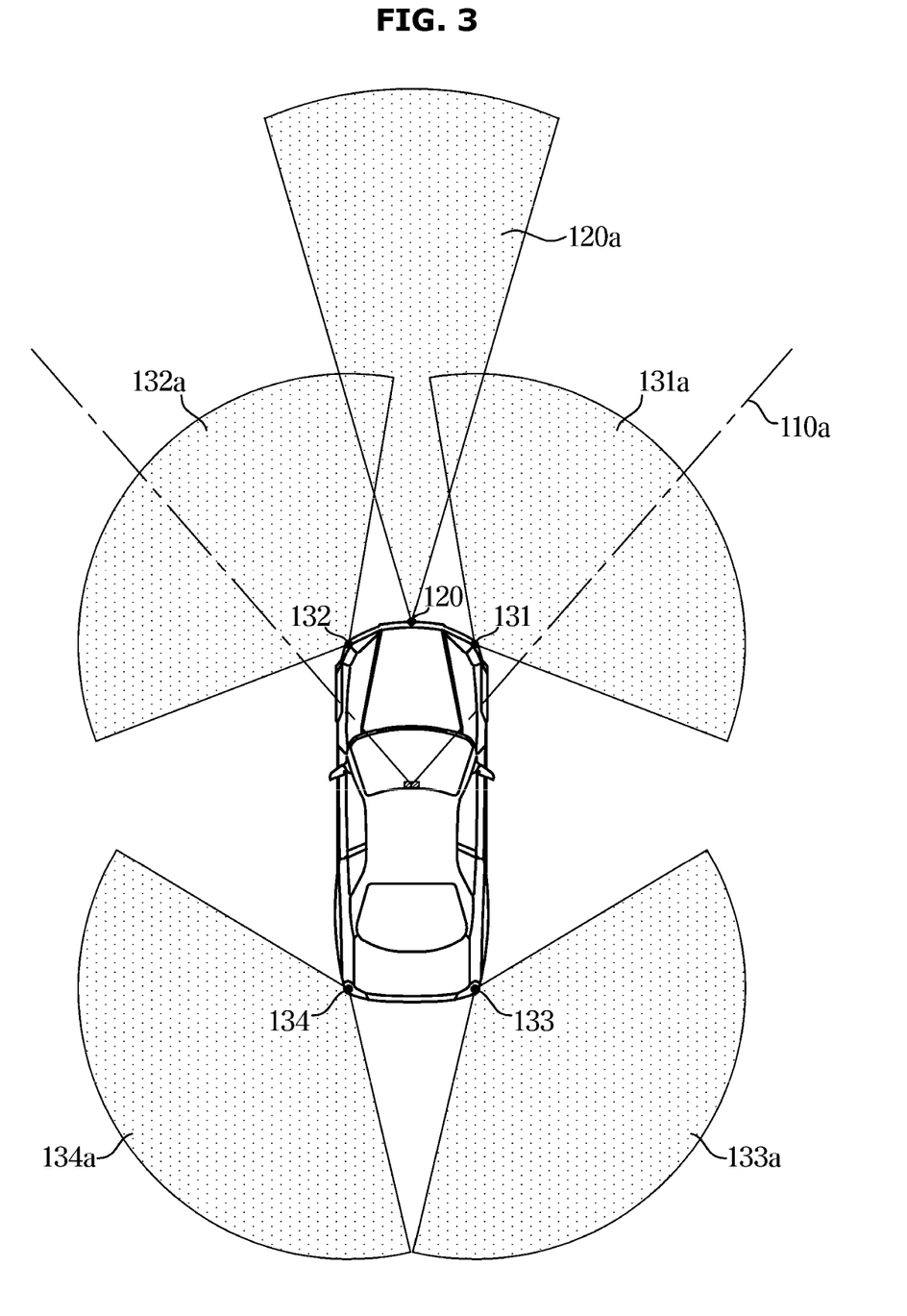
FIG. 3 illustrates a camera and a radar included in a driver assistance system according to an embodiment.

FIG. 2 is a block diagram illustrating the driver assistance system (DAS) according to an embodiment of the present disclosure. FIG. 3 is a conceptual diagram illustrating fields of view/sensing of a camera and a radar device for use in the driver assistance system (DAS) according to an embodiment of the present disclosure.

Referring to FIG. 2, the vehicle 1 may include a brake system 32, a steering system 42, and a driver assistance system (DAS) 100.

The brake system 32 may include the Electronic Brake Controller or Electronic Brake Control Module (EBCM) 31 (see FIG. 1) and the brake device 30 (see FIG. 1). The steering system 42 may include the Electronic Power Steering (EPS) device 41 (see FIG. 1) and the steering device 40 (see FIG. 1).

The DAS 100 may include one or more of a forward-view camera 110, a forward-view radar 120, and a plurality of corner radars 130.

The forward-view camera 110 may include a Field of View (FOV) 110a oriented to the forward region of the vehicle 1, as shown in FIG. 3. The forward-view camera 110 may be installed at a windshield of the vehicle 1.

The forward-view camera 110 may capture an image of the forward region of the vehicle 1, and may acquire data of the forward-view image of the vehicle 1. The forward-view image data of the vehicle 1 may include information about the position of a peripheral vehicle, a pedestrian, a cyclist, or a lane located in the forward region of the vehicle 1.

The forward-view camera 110 may include a plurality of lenses and a plurality of image sensors. Each image sensor may include a plurality of photodiodes to convert light into electrical signals, and the photodiodes may be arranged in a two-dimensional (2D) matrix.

The forward-view camera 110 may be electrically coupled to the processor or controller 140. For example, the forward-view camera 110 may be connected to the controller 140 through a vehicle communication network (NT), Hardwires, or a Printed Circuit Board (PCB).

The forward-view camera 110 may transmit the forward-view image data of the vehicle 1 to the controller 140.

The forward-view radar 120 may include a Field of Sensing (FOS) 120a oriented to the forward region of the vehicle 1 as shown in FIG. 3. The forward-view radar 120 may be mounted to, for example, a grille or a bumper of the vehicle 1.

The forward-view radar 120 may include a transmission (Tx) antenna (or a transmission (Tx) antenna array) to emit transmission (Tx) waves to the forward region of the vehicle 1 and a reception (Rx) antenna (or a reception (Rx) antenna array) to receive waves reflected from any object located in the FOS. The forward-view radar 120 may acquire forward-view radar data not only from Tx waves received from the Tx antenna, but also from reflected waves received from the Rx antenna. The forward-view radar data may include not only information about a distance between the host vehicle 1 and a peripheral vehicle (or a pedestrian or cyclist or other preceding object) located in the forward region of the host vehicle 1, but also information about a speed of the peripheral vehicle, the pedestrian, or the cyclist. The forward-view radar 120 may calculate a relative distance between the host vehicle 1 and any object based on a difference in phase (or difference in time) between Tx waves and reflected waves, and may calculate a relative speed of the object based on a difference in frequency between the Tx waves and the reflected waves.

For example, the forward-view radar 120 may be coupled to the controller 140 through a vehicle communication network (NT), Hardwires, or a PCB. The forward-view radar 120 may transmit forward-view radar data to the controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

The first corner radar 131 may include a field of sensing (FOS) 131a oriented to a forward right region of the vehicle 1, as shown in FIG. 3. For example, the forward-view radar 120 may be mounted to a right side of a front bumper of the vehicle 1. The second corner radar 132 may include an FOS 132a oriented to a forward left region of the vehicle 1, and may be mounted to, for example, a left side of the front bumper of the vehicle 1. The third corner radar 133 may include an FOS 133a oriented to a rear right region of the vehicle 1, and may be mounted to, for example, a right side of a rear bumper of the vehicle 1. The fourth corner radar 134 may include an FOS 134a oriented to a rear left region of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna. The first, second, third, and fourth corner radars 131, 132, 133, and 134 may respectively acquire first corner radar data, second corner radar data, third corner radar data, and fourth corner radar data. The first corner radar data may include information about a distance between the host vehicle 1 and an object (e.g., a peripheral vehicle, a pedestrian, or a cyclist) present in a forward right region of the host vehicle 1, and information about a speed of the object. The second corner radar data may include information about a distance between the host vehicle 1 and an object (e.g., a peripheral vehicle, a pedestrian, or a cyclist) present in a forward left region of the host vehicle 1, and information about a speed of the object. The third corner radar data may include information about a distance between the host vehicle 1 and an object (e.g., a peripheral vehicle, a pedestrian, or a cyclist) present in a rear right region of the host vehicle 1, and information about a speed of the object. The fourth corner radar data may include information about a distance between the host vehicle 1 and an object (e.g., a peripheral vehicle, a pedestrian, or a cyclist) present in a rear left region of the host vehicle 1, and information about a speed of the object.

Each of the first, second, third, and fourth corner radars 131, 132, 133, and 134 may be connected to the controller 140 through, for example, a vehicle communication network NT, Hardwires, or a PCB. The first, second, third, and fourth corner radars 131, 132, 133, and 134 may respectively transmit first corner radar data, second corner radar data, third corner radar data, and fourth corner radar data to the controller 140.

The controller 140 may include a controller (ECU) 101b (see FIG. 1) of the camera module 101 (see FIG. 1), a controller (ECU) 102b (see FIG. 2) of the radar module 102 (see FIG. 1), and/or an additional integrated controller.

The controller 140 may include a processor 141 and a memory 142.

The processor 141 may process forward-view image data of the forward-view camera 110, forward-view radar data of the forward-view radar 120, and corner radar data of the plurality of corner radars 130, and may generate a brake signal controlling the brake system 32 and a steering signal controlling the steering system 42. For example, the processor 141 may include an image processor to process forward-view image data of the forward-view camera 110, a digital signal processor to process radar data detected by the radars 120 and 130, and/or a Micro-Control Unit (MCU) to generate a brake signal and a steering signal.

The processor 141 may determine a lane in front of the vehicle 1 based on the front image data of the forward-view camera 110 and the front radar data of the forward-view radar 120.

In detail, the processor 141 may acquire the position (distance and direction), the relative speed, and the energy magnitude of the reflected wave of the objects in front of the vehicle 1 based on the front radar data of the forward-view radar 120. In addition, the processor 141 may determine the object as the plurality of radar reflectors based on the energy magnitude of the reflected wave, and determine the line connecting the determined plurality of radar reflectors as the lane.

The processor 141 may obtain lane information in front of the vehicle 1 based on the forward-view image data of the forward-view camera 110. In addition, the processor 141 may determine the lane based on the forward-view image data and the radar data.

The processor 141 may generate a braking signal and a steering signal based on the determined lane.

For example, the processor 141 may warn the driver of lane departure or transmit a brake signal to the braking system 32 based on the position of the front lane and the speed and position of the vehicle 1. In addition, the processor 141 may be configured to output a warning through audio and/or display.

The processor 141 may acquire the position (distance and direction) of the side (front right, front left, rear right, rear left) lanes of the vehicle 1 based on the corner radar data of the plurality of corner radars 130.

The processor 141 may transmit a steering signal to the steering system 42 based on the position (distance and direction) of the side lane of the vehicle 1.

For example, if the departure of the front lane is determined based on the distance to the lane or the speed at which the vehicle 1 heads to the lane, the processor 141 may transmit a steering signal to the steering system 42 to avoid lane departure of the vehicle 1.

The processor 141 may determine whether to avoid lane departure by changing the driving direction of the vehicle 1 based on the distance to the lane of the vehicle 1 or the speed at which the vehicle 1 heads to the lane. If lane keeping is predicted after steering of the vehicle 1 based on the location of the lane and the speed and direction of the vehicle 1, the processor 141 may not transmit the steering signal to the steering system 42.

The memory 142 may store programs and/or data needed for allowing the processor 141 to process image data, may store programs and/or data needed for the processor 141 to process radar data, and may store programs and/or data needed for the processor 141 to generate a brake signal and/or a steering signal.

The memory 142 may temporarily store image data received from the forward-view camera 110 and/or radar data received from the radars 120 and 130, and may also temporarily store the processed results of the image data and/or the radar data handled by the processor 141.

The memory 142 may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM), The scope or spirit of the DAS 100 according to the present disclosure is not limited to FIG. 2, and the DAS 100 may additionally or alternatively include a Light Detection And Ranging (LiDAR) sensor to detect the presence or absence of a peripheral object by monitoring (or scanning) the peripheral region of the vehicle 1.

Figure 4:
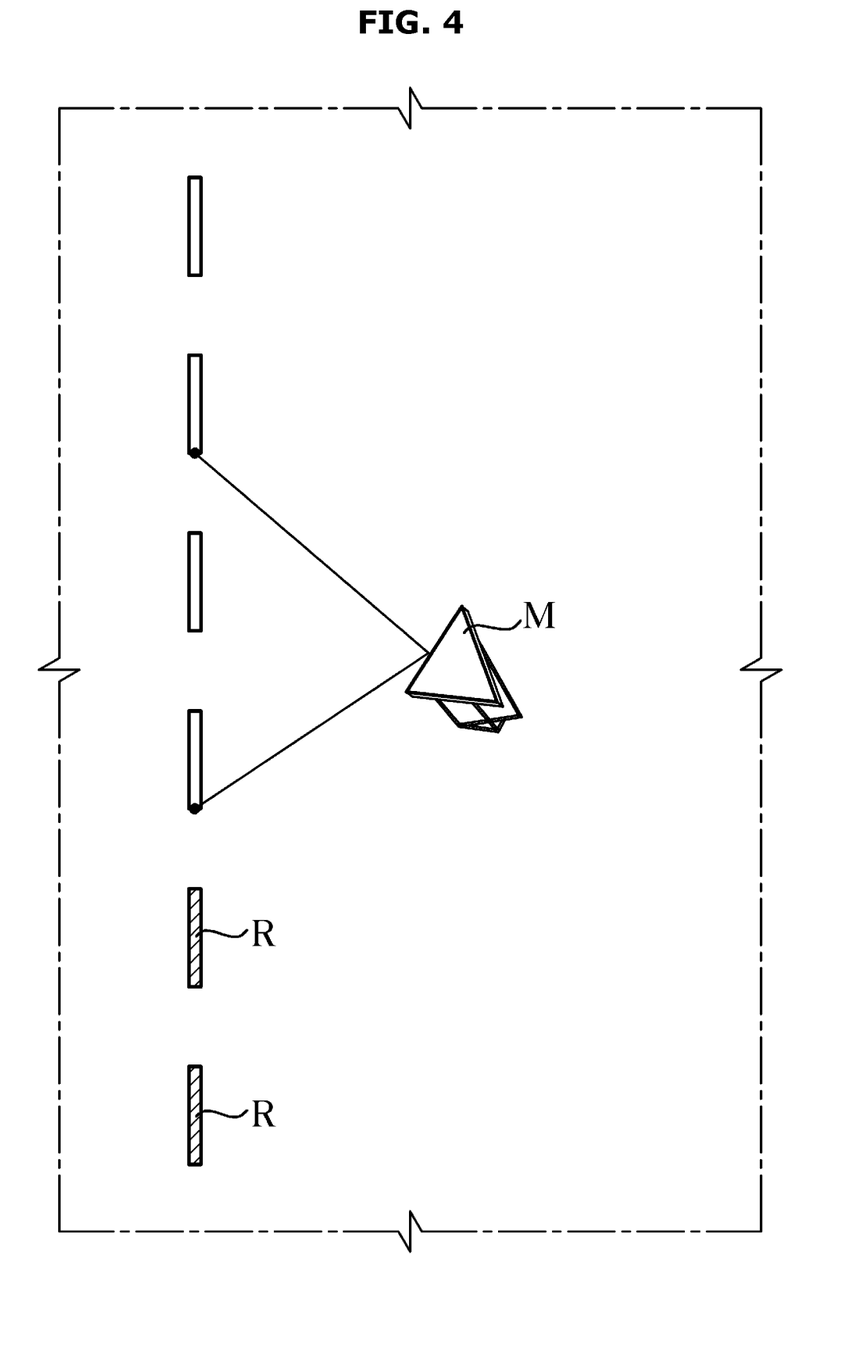
FIG. 4 illustrates an example of a lane including a radar reflector according to an exemplary embodiment.

FIG. 4 illustrates an example of a lane including a radar reflector according to an exemplary embodiment.

Referring to FIG. 4, in the lane provided with the radar reflector, the radar reflector may be a radar reflector M and/or a paint R capable of radar reflection.

Radar reflector (M) is the assembly of a reflector to improve the reflection efficiency of the radio waves radiated from the radar 102a. It may be a device made to reflect the incident propagation energy in the original direction to strengthen the response of the radar 102a.

In other words, the energy of the reflected wave reflected by the radar reflector M may be larger than the energy of the reflected wave reflected by the general object.

Radar reflective paint (R) may also be a paint that improves the reflection efficiency of the radio waves emitted from the radar 102a.

Radar reflective paint (R) may also be a paint that improves the reflection efficiency of the radio waves emitted from the radar 102a.

Radar reflective paint (R) has a low cost to install, but a high risk of being damaged by factors such as rain, driving of the vehicle 1.

The radar reflector M may be provided in the middle of the lane. In the case of the lane of the straight road, since the curvature of the lane hardly changes, each radar reflector may be provided at relatively wide intervals. In the case of curved roads, because the curvature of the lane changes, each radar reflector may be provided at relatively narrow intervals for accurate lane recognition. That is, the radar reflector M may be spaced apart at intervals inversely proportional to the curvature of the lanes.

Hereinafter, a process of determining a lane based on radar data and/or image data will be described with reference to FIGS. 5 to 6.

Figure 5:
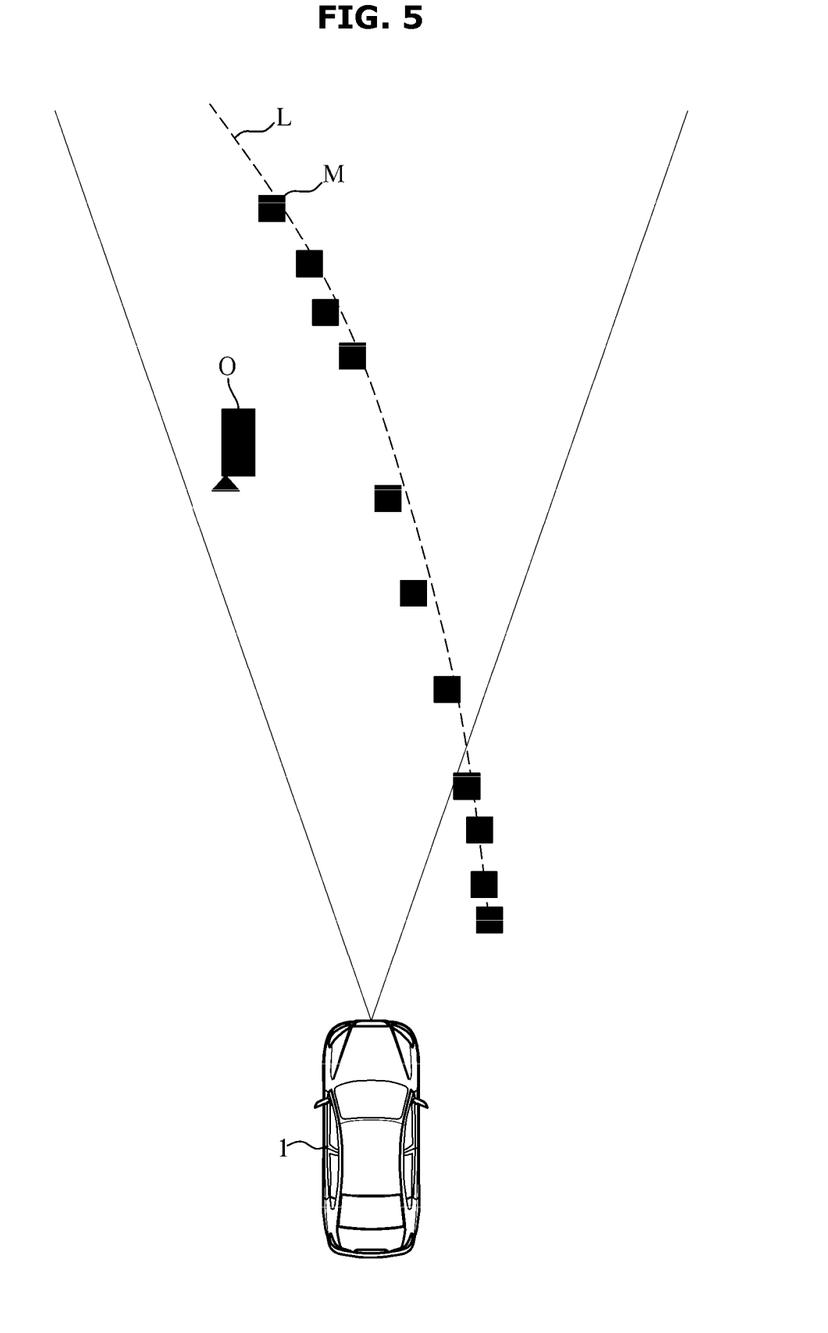
FIG. 5 is a diagram for describing a lane determination process based on radar data of a driver assistance system, according to an exemplary embodiment.

FIG. 5 is a diagram for describing a lane determination process based on radar data of a driver assistance system, according to an exemplary embodiment. For convenience of description, the radar reflector will be described on the premise that it is a radar reflector M.

Referring to FIG. 5, the driver assistance system 100 detects a front object of the vehicle 1. That is, the controller 140 may receive radar data received from the forward-view radar 120. The controller 140 may detect an object located in front of the vehicle 1 based on the radar data. For example, the controller 140 may detect a plurality of radar reflectors M located in front of the vehicle 1 based on the radar data.

The driver assistance system 100 may determine whether the object is a plurality of radar reflectors M based on the radar data.

That is, the controller 140 may determine whether the object is a plurality of radar reflectors M based on the energy magnitude of the reflected wave.

For example, the controller 140 may determine the object as the plurality of radar reflectors M when the magnitude of the reflected wave energy is greater than or equal to a predetermined magnitude. That is, the energy of the reflected wave reflected from an object other than the radar reflector M provided in the lane, for example, a driving vehicle O, a facility of a road, etc., may be smaller than the energy of the reflected wave reflected from the plurality of reflectors.

Therefore, the predetermined magnitude may be smaller than the expected energy of the reflected wave reflected from the radar reflector M and larger than the expected energy of the reflected wave reflected from the vehicle O, a facility on the road, and the like.

When the object is determined as the radar reflector M, the controller 140 may determine the line L connecting the determined plurality of radar reflectors M as a lane.

In addition, although not shown in the drawings, the controller 140 of the driver assistance system 100 may determine a lane around the vehicle 1 using the plurality of corner radars 130.

As described above, the driver assistance system 100 may assist the driver in manipulating (driving, braking, steering) the vehicle 1 based on the determined lane.

For example, the driver assistance system 100 may provide various functions that require lane information such as lane departure warning (LDW) and lane keeping assistance (LKA).

Figure 6:
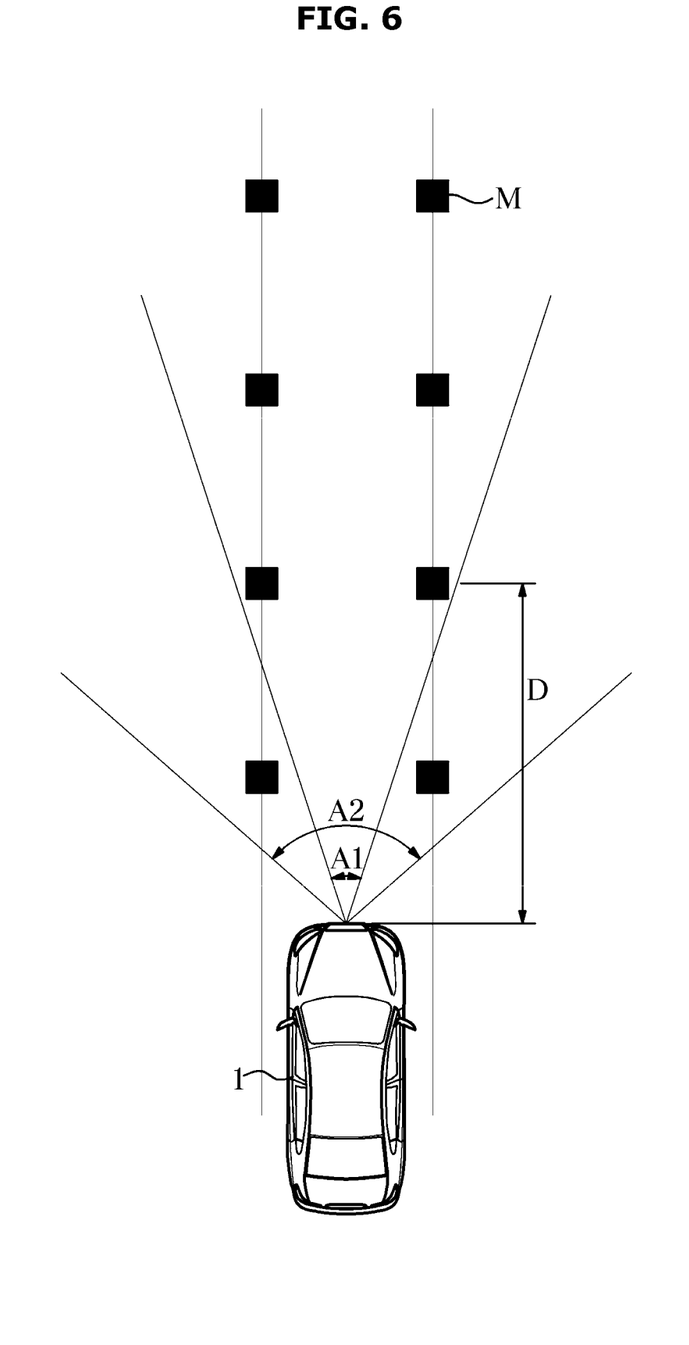
FIG. 6 is a diagram for describing a process of determining a lane based on radar data or image data by the driver assistance system according to an exemplary embodiment.

FIG. 6 is a diagram for describing a process of determining a lane based on radar data or image data by the driver assistance system according to an exemplary embodiment.

Referring to FIG. 6, when the controller 140 of the driver assistance system 100 determines a lane located farther than a predetermined distance D based on the vehicle 1, the lane may be determined based on the radar data.

The forward-view radar 120 emits radio waves in front of the vehicle 1, and acquires radar data by observing reflected waves reflected by the waves hitting the object. In order to obtain accurate radar data, the aggregated radio wave must be radiated. In this case, the radiation angle A1 of the radio wave may be smaller than the viewing angle A2 of the forward-view camera 110.

In addition, in the case of the forward-view camera 110, when recognizing a lane that is far away from the vehicle 1, the probability of misrecognizing the lane may be relatively increased due to its low resolution and low accuracy.

Accordingly, when determining the lane located farther than the predetermined distance D based on the vehicle 1, the controller 140 may determine the lane based on the radar data.

The predetermined distance D may be determined based on the radiation angle A1 of the radio wave and the viewing angle A2 of the forward-view camera 110. Or it can be predetermined as the distance D to the point where it is expected to come in contact with.

The controller 140 of the driver assistance system 100 according to an exemplary embodiment may determine a lane based on image data when determining a lane located closer than a predetermined distance D based on the vehicle 1.

As described above, since the radiation angle A1 of the radio wave may be smaller than the viewing angle A2 of the forward-view camera 110, when determining the lane located closer than the predetermined distance D based on the vehicle 1, the lane may be determined based on the image data.

In the case of the forward-view camera 110, when the lane close to the vehicle 1 is recognized, the resolution is relatively high and the accuracy is increased, so the probability of misrecognizing the lane may be relatively reduced.

In other words, the controller 140 of the driver assistance system 100 according to an embodiment determines a lane based on radar data when determining a lane located farther than a predetermined distance D based on the vehicle 1. In the case of determining a lane located close to each other, the lane may be determined based on the image data.

However, when the controller 140 of the driver assistance system 100 determines a lane based on radar data and image data, it is not limited to only considering that the position of the lane to be determined is farther or closer than a predetermined distance. If the lane is damaged due to road pollution even if it is less than the predetermined distance, the lane can be determined using radar data. If the radar reflector M is damaged and cannot be recognized, the lane may be determined using image data.

As described above, the driver assistance system 100 may assist the driver in manipulating (driving, braking, steering) the vehicle 1 based on the determined lane.

For example, the driver assistance system 100 may provide various functions that require lane information such as lane departure warning (LDW) and lane keeping assistance (LKA).

Hereinafter, a driver assistance method based on radar data according to an embodiment will be described with reference to FIG. 7.

Figure 7:
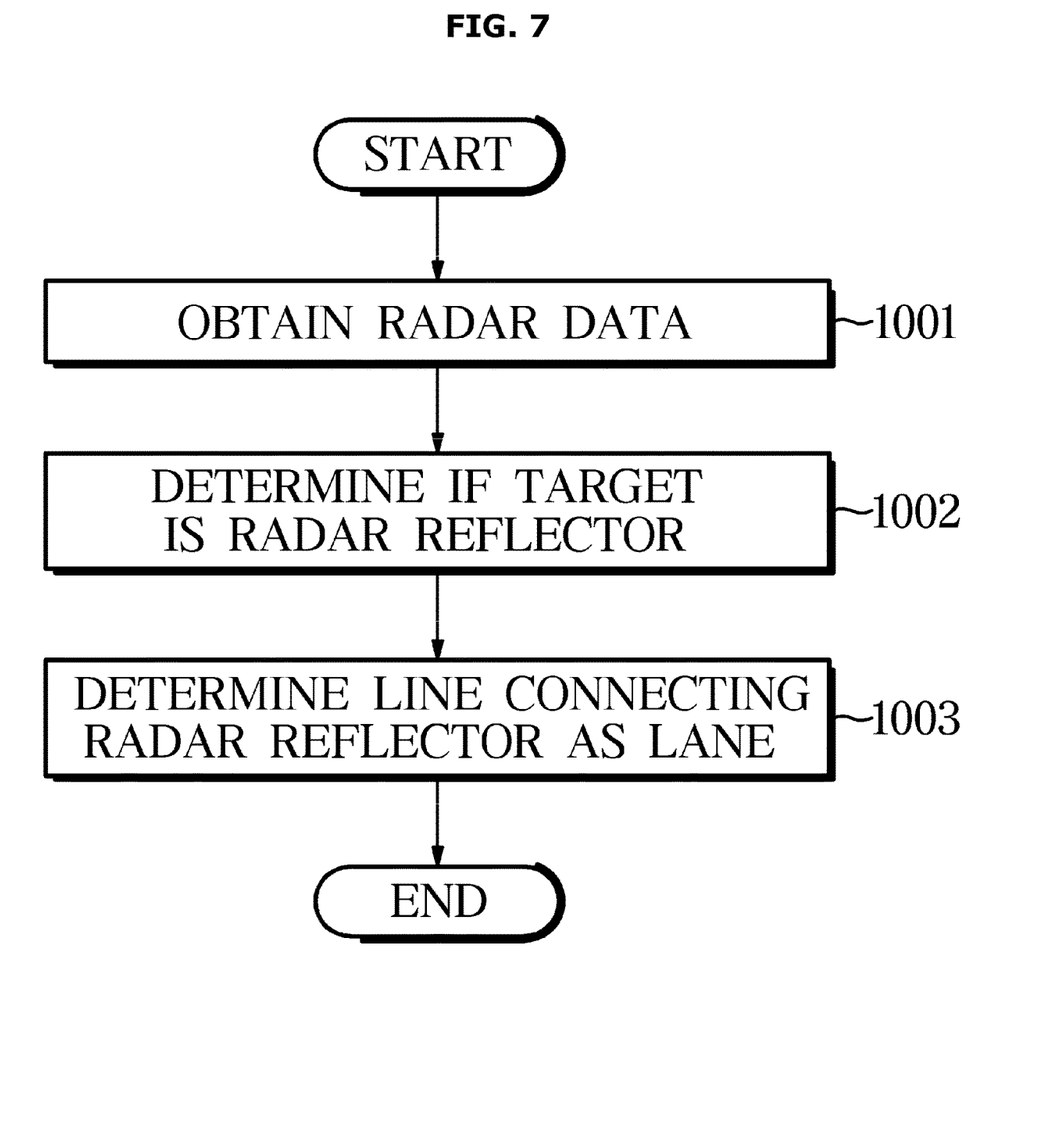
FIG. 7 is a flowchart illustrating a driver assistance method based on radar data according to an exemplary embodiment.

FIG. 7 is a flowchart illustrating a driver assistance method based on radar data according to an exemplary embodiment.

In order to implement the driver assistance method according to an embodiment, the radar 120 of the driver assistance system 100 emits radio waves in front of the vehicle 1 and acquires radar data by observing reflected waves reflected by the radio waves hitting the object (1001).

Thereafter, the controller 140 of the driver assistance system 100 may determine whether the object is the radar reflector M (1002). For example, the controller 140 may determine the object as the plurality of radar reflectors M when the magnitude of the reflected wave energy is greater than or equal to a predetermined magnitude. That is, the energy magnitude of the reflected wave reflected from an object other than the radar reflector M provided in the lane, for example, a driving vehicle, a facility of a road, and the like, may be smaller than that of the reflected wave reflected from the plurality of reflectors.

Therefore, the predetermined magnitude may be smaller than the estimated energy of the reflected wave reflected by the radar reflector M, and larger than the expected energy of the reflected wave reflected by the driving vehicle, the facility of the road, and the like.

Thereafter, the controller 140 may determine a line connecting the plurality of radar reflectors M as a lane (1003). Although not shown in the drawings, the driver assistance system 100 for implementing the driver assistance method may assist the driver in manipulating (driving, braking, steering) the vehicle 1 based on the determined lane.

For example, the driver assistance system 100 may provide various functions that require lane information such as lane departure warning (LDW) and lane keeping assistance (LKA).

Figure 8:
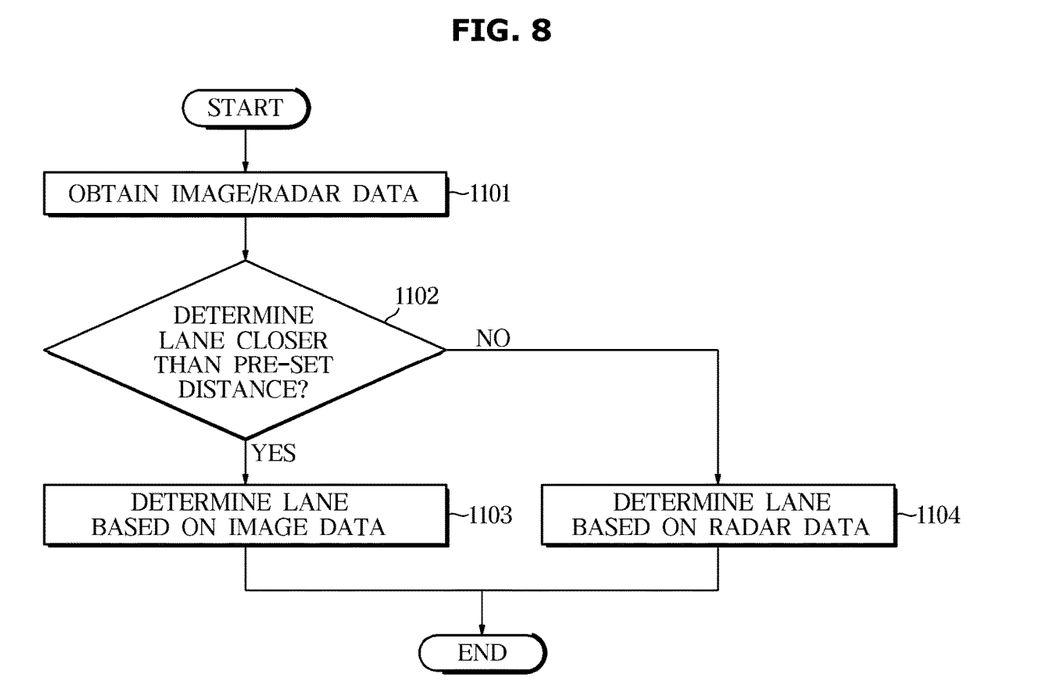
FIG. 8 is a flowchart illustrating a driver assistance method based on radar data and image data according to an exemplary embodiment.

FIG. 8 is a flowchart illustrating a driver assistance method based on radar data and image data according to an exemplary embodiment.

In order to implement the driver assistance method according to an embodiment, the radar 120 and the forward-view camera 110 of the driver assistance system 100 may acquire radar data and image data in front of the vehicle 1 (1101).

After that, the controller 140 determined whether the lane located closer than the predetermined distance or the lane located farther away than the predetermined distance based on the vehicle 1 (1102). When determining the lane located closer than the predetermined distance, the lane may be determined based on the image data (1103).

In contrast, when determining a lane located farther than a predetermined distance, the controller 140 may determine a lane based on radar data (1104).

Thereafter, although not shown in the drawings, the driver assistance system 100 for implementing the driver assistance method may assist the driver in operating (driving, braking, steering) the vehicle 1 based on the determined lane.

For example, the driver assistance system 100 may provide various functions that require lane information such as lane departure warning (LDW) and lane keeping assistance (LKA).

The above-mentioned embodiments may be implemented in the form of a recording medium storing commands capable of being executed by a computer system. The commands may be stored in the form of program code. When the commands are executed by the processor, a program module is generated by the commands so that the operations of the disclosed embodiments may be carried out. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few embodiments of the present disclosure have been shown and described, it would be appreciated by those skilled in the art that changes may be made in these embodiments without departing from the principles and spirit of the disclosure, the scope of which is defined in the claims and their equivalents.

As is apparent from the above description, the driver assistance system and the method for controlling the same according to the embodiments of the present disclosure may accurately recognize a lane by performing lane recognition based on a radar track and enable early control of a vehicle by using a remote lane recognition.

DESCRIPTION OF SYMBOLS:

| | |
|---|---|
| 1: vehicle | 10: driver assistance system |
| 110: forward-view camera | 120: forward-view radar |
| 130: corner radars | 140: controller |

What is claimed is:

1. A driver assistance system (DAS) of a vehicle configured to determine a lane provided with radar reflectors comprising:
    a radar configured to emit a radio wave in front of the vehicle and obtain radar data by receiving a reflected wave responsive to the emitted radio wave;
    a camera configured to obtain forward-view image data of the vehicle; and
    a controller configured to:
        determine the lane based on the image data or the radar data, and
        determine whether the radar data contains information of the radar reflectors based on a magnitude of energy of the reflected wave, and to determine a line connecting the determined radar reflectors as the lane,
    wherein the controller determines the lane based on the radar data when the lane based on the radar data is determined to be located farther than a predetermined distance with respect to the vehicle.

2. The driver assistance system according to claim 1, wherein
    the controller determines that the radar data contains the information of the radar reflectors when the magnitude of energy of the reflected object is greater than or equal to a predetermined magnitude.

3. The driver assistance system according to claim 1, wherein the controller determines the lane based on the image data when the lane based on the image data is determined to be located closer than the predetermined distance with respect to the vehicle.

4. The driver assistance system according to claim 1, wherein
the controller generates at least one of a braking signal and a steering signal based on the determined lane.

5. The driver assistance system according to claim 4, wherein
the controller generates the steering signal for avoiding lane departure of the vehicle when the lane departure of the vehicle is determined based on speed and a position of the vehicle with respect to the determined lane.

6. The driver assistance system according to claim 1, wherein
the controller generates a control signal for warning lane departure to a driver when the lane departure of the vehicle is determined based on speed and a position of the vehicle with respect to the determined lane.

7. The driver assistance system according to claim 6, wherein
the controller transmits the control signal of lane departure to warn the driver when the lane departure of the vehicle to at least one of an audio or display of the vehicle.

8. The driver assistance system according to claim 1, wherein
the radio reflectors are provided in spaced apart at intervals inversely proportional to a curvature of the lane.

9. A driver assistance method for a vehicle configured to determine a lane provided with radar reflectors, the method comprising:
emitting radio wave in front of the vehicle and obtaining radar data by receiving reflected wave responsive to the emitted radio wave;
obtaining forward-view image data of the vehicle;
determining whether the radar data contains information of the radar reflectors based on a magnitude of energy of the reflected wave included in the obtained radar data, and
determining a line connecting the determined radar reflectors as the lane based on the radar data,
wherein the lane based on the radar data is determined as the lane when the lane based on the radar data is determined to be located farther than a predetermined distance with respect to the vehicle.

10. The method according to claim 9, wherein
determining whether the radar data contains information of the radar reflectors based on the magnitude of energy of the reflected wave included in the obtained radar data comprises determining that the radar data contains the information of the radar reflectors when the magnitude of energy of the reflected object is greater than or equal to a predetermined magnitude.

11. The method according to claim 9, wherein
determining the lane based on the image data and the radar data comprises determining the lane based on the image data as the lane when the lane based on the image data is determined to be located closer than the predetermined distance with respect to the vehicle.

12. The method according to claim 9 further comprising:
generating at least one of a braking signal and a steering signal based on the determined lane.

13. The method according to claim 12, wherein
generating the steering signal based on the determined lane comprises generating the steering signal for avoiding lane departure of the vehicle when the lane departure of the vehicle is determined based on speed and a position of the vehicle with respect to the determined lane.

14. The method according to claim 9 further comprising:
generating a control signal for warning lane departure to a driver when the lane departure of the vehicle is determined based on speed and a position of the vehicle with respect to the determined lane.

15. The method according to claim 14 further comprising:
transmitting the control signal of lane departure to warn the driver when the lane departure of the vehicle to at least one of an audio or display of the vehicle.

16. The method according to claim 9, wherein
the radio reflectors are provided in spaced apart at intervals inversely proportional to a curvature of the lane.

17. A driver assistance system (DAS) of a vehicle configured to determine a lane provided with radar reflectors comprising:
a radar configured to emit a radio wave in front of the vehicle and obtain radar data by receiving a reflected wave responsive to the emitted radio wave;
a camera configured to obtain forward-view image data of the vehicle; and
a controller configured to:
determine the lane based on the image data or the radar data, and
determine whether the radar data contains information of the radar reflectors based on a magnitude of energy of the reflected wave, and determine a line connecting the determined radar reflectors as the lane,
wherein the controller determines the lane based on the image data when the lane based on the image data is determined to be located closer than a predetermined distance with respect to the vehicle.

18. The driver assistance system according to claim 17, wherein
the controller determines that the radar data contains the information of the radar reflectors when the magnitude of energy of the reflected object is greater than or equal to a predetermined magnitude.

19. The driver assistance system according to claim 17, wherein
the controller generates at least one of a braking signal and a steering signal based on the determined lane.

20. The driver assistance system according to claim 17, wherein
the controller generates a control signal for warning lane departure to a driver when the lane departure of the vehicle is determined based on speed and a position of the vehicle with respect to the determined lane.

* * * * *